(12) United States Patent
Hwang et al.

(10) Patent No.: US 6,501,594 B1
(45) Date of Patent: Dec. 31, 2002

(54) LONG-BAND FIBER AMPLIFIER USING FEEDBACK LOOP

(75) Inventors: Seong-Teak Hwang, Pyongtaek; Soo-Young Yoon, Yongin; Rae-Sung Jung, Suwon; Jeong-Mee Kim, Yongin; Sung-Jun Kim, Pyongtaek, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/624,135

(22) Filed: Jul. 21, 2000

(30) Foreign Application Priority Data

Jul. 22, 1999 (KR) .............................. 99-29824

(51) Int. Cl.$^7$ ........................ H04B 10/17; H04B 10/12; H01S 3/00
(52) U.S. Cl. ............................. 359/341.32; 359/341.3; 359/345; 359/341.4; 372/6
(58) Field of Search .............................. 359/345, 341.4, 359/341.32, 333, 337.11, 337.13, 341.3, 341.1; 372/6

(56) References Cited

U.S. PATENT DOCUMENTS

| | | | |
|---|---|---|---|
| 5,088,095 A | 2/1992 | Zirngibl | 372/6 |
| 5,117,196 A | 5/1992 | Epworth et al. | 359/333 |
| 5,128,800 A | 7/1992 | Zirngibl | 359/341.4 |
| 5,153,933 A | 10/1992 | Smith et al. | 385/27 |
| 5,239,607 A | 8/1993 | da Silva et al. | 385/122 |
| 5,245,690 A | 9/1993 | Aida et al. | 385/142 |
| 5,392,153 A * | 2/1995 | Delavaux | 359/341 |
| 5,434,701 A * | 7/1995 | Fatehi | 359/341 |
| 5,455,835 A | 10/1995 | Atkins et al. | 372/6 |
| 5,995,277 A * | 11/1999 | Kim | 359/341 |
| 6,016,218 A | 1/2000 | Jo et al. | 359/341.33 |
| 6,031,660 A | 2/2000 | Park et al. | 359/341.4 |
| 6,222,670 B1 * | 4/2000 | Ryu | 359/345 |
| 6,175,436 B1 * | 1/2001 | Jackel | 359/179 |
| 6,201,637 B1 * | 3/2001 | Nilsson et al. | 359/169 |
| 6,233,092 B1 * | 5/2001 | Flood | 359/345 |
| 6,252,700 B1 * | 6/2001 | Hwang et al. | 359/337 |
| 6,307,667 B1 * | 10/2001 | Liang | 359/337 |
| 6,317,254 B1 * | 11/2001 | Park et al. | 359/341.33 |
| 6,356,385 B1 * | 3/2002 | Digonnet et al. | 359/337 |

OTHER PUBLICATIONS

Ono, H. et al. "1.58 um Band Er3+–Doped fibre amplifier pumped in the 0.98 and 1.48 um bands." Elect. Lett, vol. 33 No. 10, May 8, 1997. pp. 876–877.*

Yamada, M. et al. "Broadband and gain–flattened amplifier composed to fa 1.55 um–band and a 1.58 um–band Er3+ doped fibre amplifier in a parallel configuration." Elect. Lett. vol. 33, No. 8, Apr. 10, 1997. pp. 710–711.*

(List continued on next page.)

Primary Examiner—Thomas H. Tarcza
Assistant Examiner—Andrew R. Sommer
(74) Attorney, Agent, or Firm—Robert E. Bushnell, Esq.

(57) ABSTRACT

Disclosed is a long-band (L-band) fiber amplifier using a feedback loop which includes a rare earth doped fiber as an amplification medium, forward and backward pump laser diodes, positioned on front and rear ends of the rare earth doped fiber, respectively, for generating pumping lights, first wavelength selective couplers for providing the pumping lights from the pump laser diodes to the rare earth doped fiber, optical isolators, inserted into front and rear ends of the first wavelength selective couplers, respectively, for intercepting backward propagation of signal lights reflected from input and output terminals of the fiber amplifier, a feedback loop for making a seed beam incident to the rare earth doped fiber or making an amplified spontaneous emission (ASE) incident again to the rare earth doped fiber, second wavelength selective couplers, provided between the optical isolators and the first wavelength selective couplers, respectively, for making the seed beam incident to the feedback loop or extracting and providing the ASE to the feedback loop, and a filter, connected to the feedback loop, for filtering a specified wavelength of the seed beam or the ASE.

29 Claims, 7 Drawing Sheets

OTHER PUBLICATIONS

Min, B. et al. "Performance Improvement of Wideband EDFA by ASE Injection from C band to L band Amplifier." APCC/OECC '99 ; Fifth Asia–Pacific Conference on . . . ; and $4^{th}$ Optoelectronics and Communications Conf., vol. 2, Jun. 1999. pp. 1346–1347.*

Sugaya, et al. "1.58–um–band Er3+ doped Fiber Amplification with a 1.55–um–Band Light Injection." OECC Tech. Digest , Jul. 1998. pp unknown.*

Massicott, J.F. et al. "High Gain, Broadband, 1.6 um Er3+ Doped Silica Fibre Amplifier." Electronics Letters, vol.: 26 Issue: 20, Sep. 27, 1990 pp. 1645–1646.*

Massicott, J.F. et al. "Low Noise Operation of Er3+ Doped Silica Fibre Amplifier Around 1.6 um." Electron. Lett. vol. 28, No. 20, Sep. 24, 1992. pp. 1924–1925.*

Jinno, M. et al. "First Demonstration o f1580 nm wavelength band WDM transmission for doubling usable bandwidth an dsupressing FWM in DSF." Electran. Lett. vol. 33, No. 10, May 8, 1997. pp. 882–883.*

Paschotta, R. et al. "Ytterbium–Doped Fiber Amplifiers." IEEE J. Quantum Elect. vol. 33, No. 7, Jul. 1997. pp 1049–1056.*

Ono, H. et al. "Gain–Flattened Er3+–Doped Fiber Amplifier for a WDM Signal in the 1.57–1.60 um Wavelength Region." IEEE Photonics Tech. Lett. vol. 9, No. 5, May 1997. pp 596–598.*

Kashyap, R. et al. "Wideband Gain Flattened Erbium Fibre Amplifier using a Photosensitive Fibre Blazed Grating." Electron. Lett. vol. 29, No. 2, Jan. 21, 1993. pp 154–156.*

Kinoshita, S. "Broadband Fiber Optic Amplifiers." Optical Fiber Communication Conference and Exhibit, 2001. OFC 2001, vol.: 2, 2001. pp. TuA1–2–TuA1–04.*

Kinoshita, S. "Advances in Fiber Optic Amplifiers for WDM Systems." Communications, 1999. APCC/OECC '99. Fifth Asia–Pacific Conference on . . . and Fourth Optoelectronics and Communications Conference , vol.: 2, 1999. pp 1333–1334.*

Yadlowsky, M.J. "Ultra Broadband optical amplifiers." Optical Fiber Communication Conference, 1999, and the International Conference on Integrated Optics and Optical Fiber Communication. OFC/IOOC '99. Technical Digest, pp. 2–3, vol. 2.*

Masuda, H. "Reivew of wideband hybrid amplifiers." Optical Fiber Communication Conference, 2000, vol.: 1, 2000 pp. 2 –4 vol. 1.*

Chung, J. et al. "Performances o fall optical gain–clamped EDFAs with different feedback wavelengths for use in multiwavelength optical networks." OFC Tech Digest, OFC '97. pp 22–24.*

Whitley, T. "Laser Diode Pumped Operation of Er3+–Doped Fibre Amplifier." Elect. Lett. vol. 24, No. 25, Dec. 8, 1988. pp 1537–1539.*

Shigematsu, M. "A Novel Configuration of L–Band Erbium–Doped Fiber Amplifier for Improved Efficiency." Source: unknown date: Sep. 1999. pages: unknown.*

Nilsson, J. et al. "Long–Wavelength Erbium–Doped Fiber Amplifier Gain Enhanced by ASE End–Reflectors." IEEE Photonics Tech. Lett. vol. 10, No. 11, Nov. 1998. pp 1551–1553.*

Lee, J. et al. "Enhancement of Power Conversion Efficiency of an L–Band EDFA with a Secondary Pumping Effect in the Unpumped EDF Section." IEEE Photonics Tech. Lett. vol. 11, No. 1, Jan. 1999. pp. 42–44.*

Desurvire, E. "Erbium–Doped Fiber Amplifiers: Principles and Applications." John Wiley & Sons, Inc. New York, 1994. pp. 473–489.*

Yu, Q. and Fan, C. "Simple Dynamic Model of All–Optical Gain–Clamped Erbium–Doped Fiber Amplifiers." J. Lightwave Tech. vol. 17, No. 7. Jul. 1999. pp. 1166–1171.*

Okamura, H. "Automatice Optical Loss Compensation with Erbium–Doped Fiber Amplifiers." J. Lightwave Tech. vol. 10, No. 8 Aug. 1992. pp. 1110–1116.*

Karasek, M and Valles, J.A. "Analysis of Channel Addition/ Removal Response in All–Optical Gain–Controlled Cascade of Erbium–Doped Fiber Amplifers." J. Lightwave Tech. vol. 16, No. 10. Oct. 1998. pp. 1795–1803.*

Sun, Y. et al. "Optical Fiber Amplifiers for WDM Optical Networks." Bell Labs Technical Journal. Jan.–Mar. 1999. pp. 187–206.*

Liu, Y. et al. "Transient Control in EDFA's by Dual–Cavity Optical Automatic Gain Control." IEEE Photonics Tech. Lett. 11:11, Nov. 1999, pp. 1381–1383.*

Richards, D.H. "A Theoretical Investigation of Dynamic All–Optical Automatic Gain Control in Multichannel EDFA's and EDFA Cascades." IEEE J. Selected Topics in Quantum Elect. 3:4, Aug. 1997, pp. 1027–1036.*

Luo, G. et al. "Relaxation oscillations and spectral hole burning in laser automatic gain control of EDFAs." OFC'97 pp. 130–.*

* cited by examiner

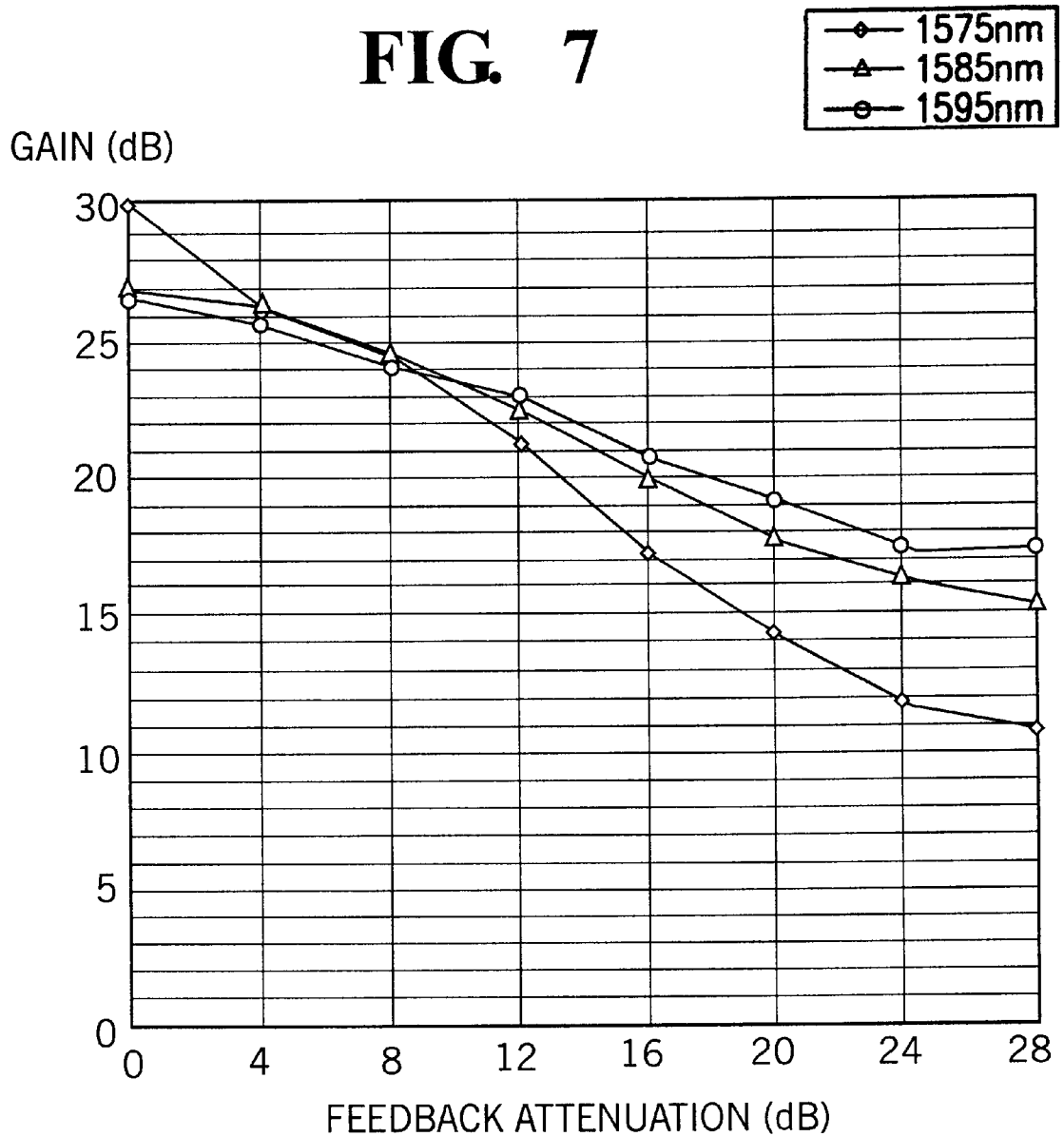

LONG-BAND FIBER AMPLIFIER USING FEEDBACK LOOP

CLAIM OF PRIORITY

This application makes reference to, incorporates the same herein, and claims all benefits accruing under 35 U.S.C. § 119 from an application entitled LONG BAND FIBER AMPLIFIER USING FEEDBACK LOOP earlier filed in the Korean Industrial Property Office on the day of Jul. 22nd 1999, and there duly assigned Serial No. 29827/1999, a copy of which is annexed hereto.

BACKGROUND OF THE INVENTION

1. Technical Field

The present invention relates to a fiber amplifier of an optical communication system, and more particularly to a fiber amplifier of a long band (1575 nanometers~1605 nanometers) used for widening an amplification band of a fiber amplifier.

2. Related Art

Wavelength division multiplex (WDM) transmission is an information transmission scheme using optical fibers in which the wavelength area of an optical fiber is separated into a plurality of channels, the channels are multiplexed, and thus signals at different wavelengths are transmitted through the optical fiber at the same time, to thereby increase information transmission capacity.

A plurality of optical amplifiers are used between a transmitter and a receiver in a wavelength division multiplex transmission system to compensate for signal attenuation resulting from long distance transmission. The efficiency of optical amplifiers is important for transmission of optical signals.

I have found that it would be desirable to increase optical amplification efficiency. Efforts have been made in the area of optics and feedback loops.

Exemplars of recent efforts in the art include U.S. Pat. No. 5,239,607 for Optical Fiber Amplifier with Flattened Gain issued to da Silva et al., U.S. Pat. No. 5,455,835 for Article Comprising an Optical Waveguide Laser issued to Atkins et al., U.S. Pat. No. 5,153,933 for Apparatus for Generating a Comb of Optical Teeth of different Wavelengths issued to Smith et al., U.S. Pat. No. 5,117,196 for Optical Amplifier Gain Control issued to Epworth et al., U.S. Pat. No. 5,088,095 for Gain Stabilized Fiber Amplifier issued to Zimgibl, U.S. Pat. No. 5,128,800 for Gain Switchable Optical Fiber Amplifier issued to Zirngibl, U.S. Pat. No. 6,031,660 for Analog/Digital Double Automatic Power Controlling Device in an Optical Fiber Amplifier issued to Park et al., U.S. Pat. No. 5,245,690 for Optical Fiber Amplifier Including Rare Earth Doped Fiber And Feedback Pump Light Source Control issued to Aida et al., U.S. Pat. No. 6,016,218 for Optical Fiber Amplifier issued to Jo et al.

While these recent efforts provide advantages, I note that they fail to adequately provide an L-band (long band) optical amplifier using a feedback loop increasing amplification efficiency.

SUMMARY OF THE INVENTION

Accordingly, the present invention has been made in an effort to solve the problems occurring in the related art, and an object of the present invention is to provide along-band (L-band) erbium doped fiber amplifier which can increase the amplification efficiency in the L-band, so that the communication capacity is increased in developing a fiber amplifier having a long amplification band.

It is another object of the present invention to provide an L-band erbium doped fiber amplifier which can reduce the manufacturing cost thereof.

It is still another object of the present invention to provide an L-band erbium doped fiber amplifier which can improve the gain evenness according to the wavelength of the signal light.

In order to achieve the above objects, according to the present invention, there is provided an L-band fiber amplifier comprising a rare earth doped fiber as an amplification medium, forward and backward pump laser diodes, positioned on front and rear ends of the rare earth doped fiber, respectively, for generating pumping lights, first wavelength selective couplers for providing the pumping lights from the pump laser diodes to the rare earth doped fiber, optical isolators, inserted into front and rear ends of the first wavelength selective couplers, respectively, for intercepting backward propagation of signal lights reflected from input and output terminals of the fiber amplifier, a feedback loop for making a seed beam incident to the rare earth doped fiber or making an amplified spontaneous emission (ASE) incident again to the rare earth doped fiber, second wavelength selective couplers, provided between the optical isolators and the first wavelength selective couplers, respectively, for making the seed beam incident to the feedback loop or extracting and providing the ASE to the feedback loop, and a filter, connected to the feedback loop, for filtering a specified wavelength of the seed beam or the ASE.

In another aspect of the present invention, there is provided an L-band fiber amplifier comprising a rare earth doped fiber as an amplification medium, forward and backward pump laser diodes, positioned on front and rear ends of the rare earth doped fiber, respectively, for generating pumping lights, first wavelength selective couplers for providing the pumping lights from the pump laser diodes to the rare earth doped fiber, optical isolators, inserted into front and rear ends of the first wavelength selective couplers, respectively, for intercepting backward propagation of signal lights reflected from input and output terminals of the fiber amplifier, a feedback loop for making a seed beam incident to the rare earth doped fiber or making an amplified spontaneous emission (ASE) incident again to the rare earth doped fiber, second wavelength selective couplers, provided between the optical isolators and the first wavelength selective couplers, respectively, for making the seed beam incident to the feedback loop or extracting and providing the ASE to the feedback loop, a filter, connected to the feedback loop, for filtering a specified wavelength of the seed beam or the ASE, and an optical attenuator, connected between the second wavelength selective coupler and the filter, for attenuating a strength of the seed beam or the ASE to adjust a gain evenness of a source output.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

FIG. 7 is a graph illustrating the attenuation degree of signal lights in the feedback loop with respect to three signal lights having different wavelengths from one another, but the same strength, i.e., the gains of the three signal lights according to the strength of the seed beam, in accordance with the principles of the present invention.

DETAILED DESCRIPTION OF THE PREFERRED EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

The preferred embodiments of the present invention will now be explained in detail with reference to the accompanying drawings. In the following description of the present invention, a detailed description of known functions and configurations incorporated herein will be omitted when it may make the subject matter of the present invention rather unclear.

As the demand for communications is increased, a wavelength division multiplexing (WDM) optical communication system has been widely used. Accordingly, research for a fiber amplifier that can accommodate more channels is desired.

Typically, the wavelength division multiplexing (WDM) communication system simultaneously transmits signal lights of various channels through a single optical path. In the case of transmitting such signal lights over several thousands of kilometers, the loss of the signal lights occurs every several tens of kilometers, and thus a fiber amplifier for compensating for the loss is installed midway.

Also, in the wavelength division multiplexing (WDM) communication system using a multichannel, the channel spacing generally used is 0.8 nanometers (nm), and the number of channels is increased to 8, 16, 32, 40, 64, etc. The wavelength band in the range of 1528 nm~1562 nm, i.e., the conventional band (C-band) which is the amplification band of the existing erbium doped fiber amplifier (EDFA), can be used until the number of channels reaches 40, but a new wavelength band is required if the channel number is increased over 64. If the channel spacing is determined to be 0.4 nm in the existing wavelength band, the number of channels that can be used is increased up to 80 channels, but many technical difficulties exist due to a nonlinear phenomenon, etc. Accordingly, researches for a new wavelength band in the range of 1575 nm~1605 nm, i.e., a long band (L-band) which can be amplified by the erbium doped fiber amplifier (EDFA), have been actively progressed.

Figure 1:
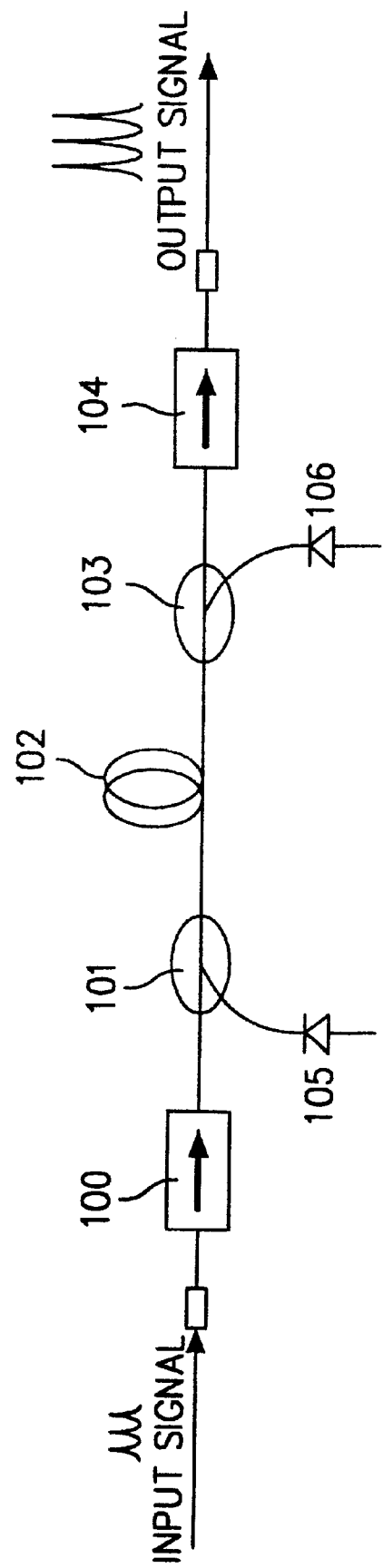
FIG. 1 is a block diagram illustrating the construction of a fiber amplifier.

FIG. 1 is a view illustrating the construction of an erbium doped fiber amplifier (EDFA). Referring to FIG. 1, the EDFA comprises optical isolators 100 and 104 for intercepting lights propagating in a backward direction, an erbium doped fiber (EDF) 102 that is an amplification medium, and wavelength selective couplers (WSC) 101 and 103 for making pumping lights from pump light sources 105 and 106 incident to the EDF 102.

The L-band EDFA as constructed above shown in FIG. 1 has the same structure as the EDFA for amplifying the C-band of 1530 nm~1560 nm, but in order to increase the gain of the L-band, the length of the EDF 102 is 10 times lengthened.

However, the EDFA of FIG. 1 has the drawbacks in that if the same pumping light is used, its amplification efficiency is lowered in comparison to the C-band EDFA since the EDF 102 is lengthened. Basically, the L-band EDFA has a relatively superior gain evenness in comparison to the C-band EDFA, but the gain evenness thereof is changed according to the strength of the input signal light or the strength of the pumping light in the same manner as the C-band EDFA.

The L-band EDFA amplifies the optical signal by exciting Erbium ions by an amplified spontaneous emission (ASE) generated in the C-band EDFA. Generally, the pumping efficiency of the EDFA is in proportion to the peak power of the pumping light rather than the total power of the pumping light.

However, according to the ASE, the strength of the total power is high, but the strength of the peak power is low, so that the pumping efficiency is lowered.

If the light of the conventional band (C-band) is used as the seed beam to compress the ASE having a long band (L-band) to a light having a narrow band, an excited light having a large maximum output which can excite the L-band can be obtained, and thus the amplification efficiency of the L-band can be increased. Here, the seed beam is a kind of an auxiliary light source, and according to the present invention, it is called the ASE generated when an input light passes through the erbium doped fiber.

The seed beam according to the present invention can be used as an independent light source, and also as a light source to which the ASE of the EDFA is fed back. According to the present invention, it is exemplified that the fiber amplifier uses the ASE as the seed beam, and the erbium doped fiber is used as the amplification medium. However, the amplification medium according to the present invention is not limited to the erbium doped fiber.

Figure 2:
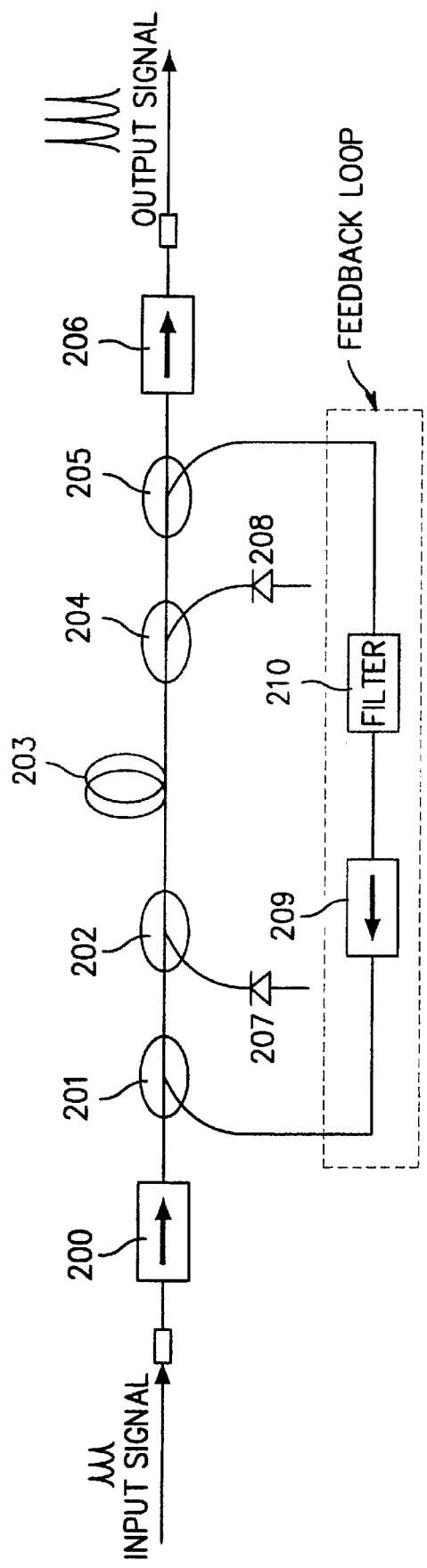
FIG. 2 is a block diagram illustrating the construction of a fiber amplifier using a feedback loop provided with a forward optical isolator according to a first embodiment of the present invention.

FIG. 2 is a block diagram illustrating the construction of an erbium doped fiber amplifier according to a first embodiment of the present invention. Especially, FIG. 2 shows the fiber amplifier for making the seed beam incident in a forward direction using the amplified spontaneous emission (ASE) generated when the optical signal is amplified using the EDF. Referring to FIG. 2, the present invention has the construction which increases the output in the L-band by adding the seed beam to the existing erbium doped fiber amplifier.

According to the fiber amplifier according to the first embodiment of the present invention, an erbium doped fiber (EDF) 203 is used as the amplification medium, and front and rear optical isolators 200 and 206 are inserted to intercept the backward lights centering around the EDF 203. Also, first wavelength selective couplers (WSC) 202 and 204 are used for making the respective pumping lights from forward and backward pumping light sources 207 and 208 incident to the EDF 203. Front optical isolator 200 is upstream of EDF 203, while rear optical isolator 206 is downstream of EDF 203. Light being conveyed upstream is light being conveyed backward.

At this time, the present invention employs a feedback loop using a specified wavelength of the ASE to make the seed beam. The feedback loop of the fiber amplifier according to the embodiment of the present invention is provided with a filter 210 for selecting the specified wavelength to make the seed beam, and an optical isolator 209 for preventing the backward propagation of the seed beam fed back. Also, the present invention employs second wavelength selective couplers 201 and 205 for making the seed beam extracted by the feedback loop incident again to the EDF 203. The positions of the wavelength couplers 201 and 205 can be said to correspond to the positions of first and second terminals of the feedback loop, respectively.

The optical isolator 209 is a forward optical isolator the propagation direction of which is the same as that of the signal light. The filter 210 for selecting the specified wavelength is inserted between the second wavelength selective coupler 205 and the forward optical isolator 209.

According to the present invention, the second wavelength selective couplers (WSC) 201 and 205 are used for making the seed beam incident again to the EDF using the feedback loop, and the ASE is fed back to the amplification medium using the wavelength selective couplers 201 and 205.

The operation of the erbium doped fiber amplifier as constructed above will be explained in detail. The input optical signal is conveyed downstream from an input terminal toward an output terminal. The input optical signal inputted through the input terminal is combined with the pumping light, which is generated from the forward pump light source 207 provided on the front of the EDF 203, by the first wavelength selective coupler 202, and then is incident to the EDF 203. The pumping light generated from the backward pump light source 208 provided on the rear of the EDF 203 is incident to the EDF 203 through the second wavelength selective coupler 204. The incident forward and backward pumping lights excite erbium ions in the EDF 203. The light signal passing through the EDF is amplified by the stimulated emission of the excited erbium ions. The first and second optical isolators 200 and 206 prevent the deterioration of the amplification efficiency of the optical signal by preventing the ASE generated from the EDF 203 from being reflected from optical elements such as a signal input/output connector and then being incident again to the EDF 203.

At this time, in order to heighten the output in the L-band in the range of 1570 nm~1620 nm using the erbium doped fiber amplifier for amplifying the optical signal, the length of the amplification medium, i.e., the length of the EDF 203 should be sufficiently lengthened. Especially, the length of the EDF 203 used for the L-band EDFA is 10 times longer than that generally used for the C-band EDFA.

The erbium ions excited by the pumping lights from the forward and backward pump light sources 207 and 208 are under the amplified spontaneous emission (ASE), and then the ASE light generates a high output ASE in the C-band of 1528 nm~1562 nm by the stimulated emission. The ASE of the C-band is absorbed as it passes through the EDF 203, and this causes the light of the L-band wavelength, which is longer than the C-band wavelength, to be amplified. Accordingly, if the length of the EDF 203 is lengthened in order to increase the source output in the L-band, the output of the C-band is reduced, and the output in the L-band is increased. Since the C-band has a wide wavelength, the strength of the total power is big, but the strength of the peak power is small.

More erbium ions in the EDF 203, which is the amplification medium, are excited as the peak power for each wavelength, rather than the total power, becomes greater, resulting in that the output in the L-band can be efficiently heightened. Accordingly, if the seed beam in the C-band is used, the seed beam on the front of the EDF is amplified to heighten the output, and thus the L-band can be more efficiently amplified using the amplified seed beam. At this time, a specified wavelength can be selected using the filter 210 for filtering the ASE generated from the EDFA to use the specified wavelength as the seed beam. It is preferable that the filter 210 according to the present invention is fixed to use the wavelength of 1559nm corresponding to the highest amplification efficiency.

Figure 3:
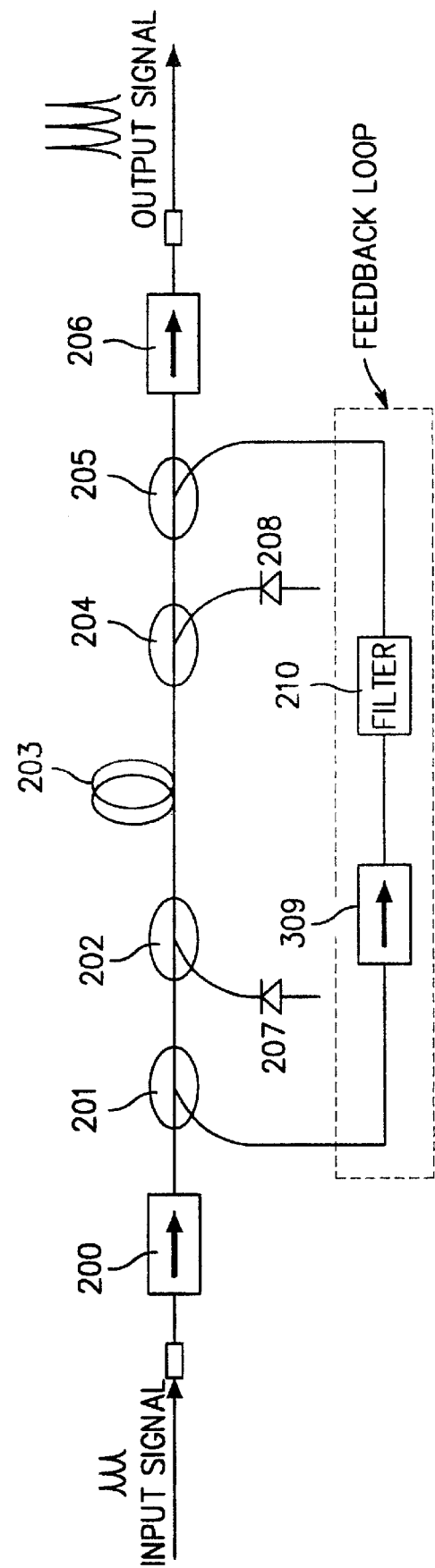
FIG. 3 is a block diagram illustrating the construction of a fiber amplifier using a feedback loop provided with a backward optical isolator according to a second embodiment of the present invention.

FIG. 3 is a block diagram illustrating the construction of an erbium doped fiber amplifier using a feedback loop according to a second embodiment of the present invention. Comparing the erbium doped fiber amplifier as shown in FIG. 3 with the erbium doped fiber amplifier as shown in FIG. 2, the installation direction of the optical isolator provided in the feedback loop is different from each other, but other elements are identical. Thus, only the point of difference thereof will be explained, with other explanations thereof omitted.

As shown in FIG. 3, the optical isolator provided in the feedback loop is a backward optical isolator. Specifically, the optical isolator 309 is installed in a backward direction of the signal light propagation. The backward optical isolator 309 is provided between the second wavelength selective coupler 201 and the filter 210. According to the above-described construction, the erbium ions in the EDF excited by the pumping light from the pump light source are spontaneously emitted, and this spontaneously emitted light generates a high output in the C-band by the stimulated emission. By making the ASE incident again, the output of the L-band can be efficiently heightened.

Figure 4:
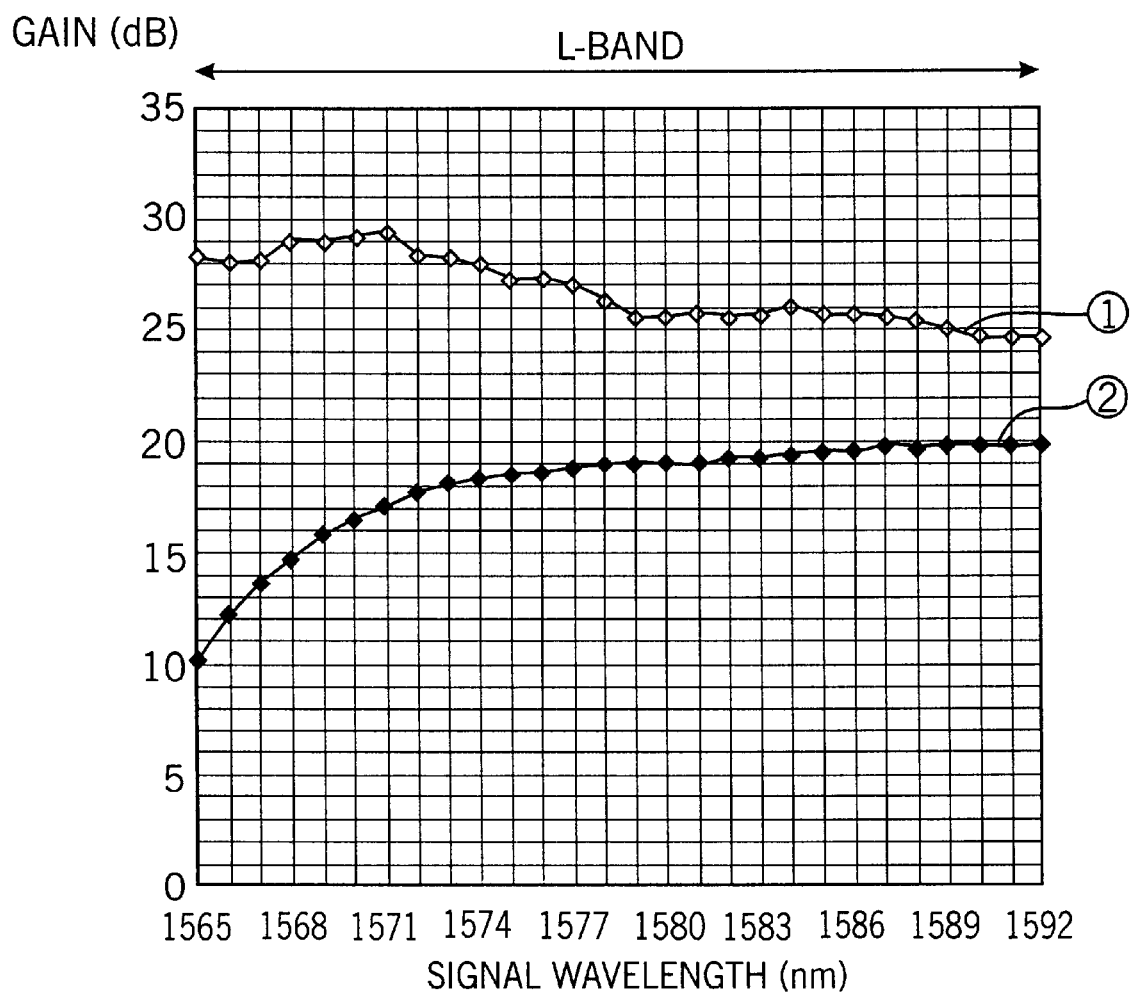
FIG. 4 is a graph illustrating the gain characteristic of the fiber amplifier using a feedback loop according to the present invention compared with that of the fiber amplifier using no feedback loop in the L-band.

FIG. 4 is a graph illustrating the gain of the L-band EDFA according to the wavelength of the signal light in the case of using the seed beam (reference numeral "1") and in the case of using no seed-beam (reference numeral "2"). As shown in FIG. 4, when the seed beam is used in a given wavelength with respect to the signal light having the strength of −15 decibel meters (dBm), the gain is increased over 5 decibels (dB) in comparison to the case that no seed beam is used. Though there exists some difference according to the length of the EDF and the wavelength and strength of the tested signal light, it can be recognized that the efficiency of the fiber amplifier is greatly increased in the case of using the seed beam.

Figure 5:
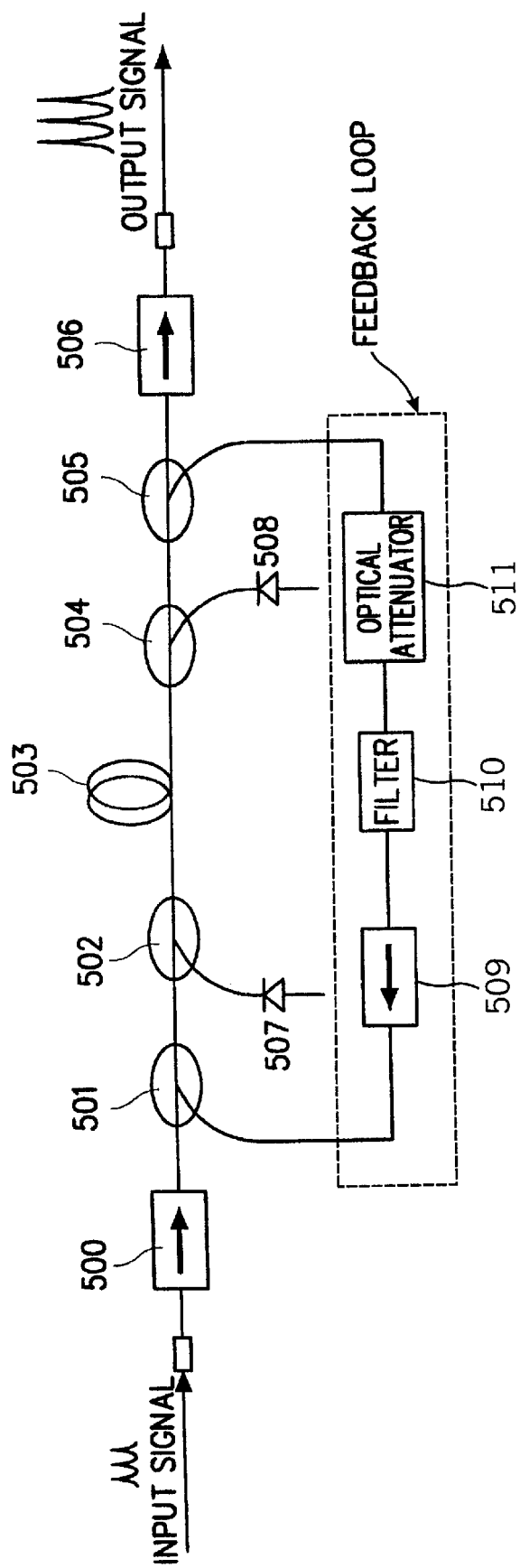
FIG. 5 is a block diagram illustrating the construction of a fiber amplifier using a feedback loop provided with a forward optical isolator according to a third embodiment of the present invention.
Figure 6:
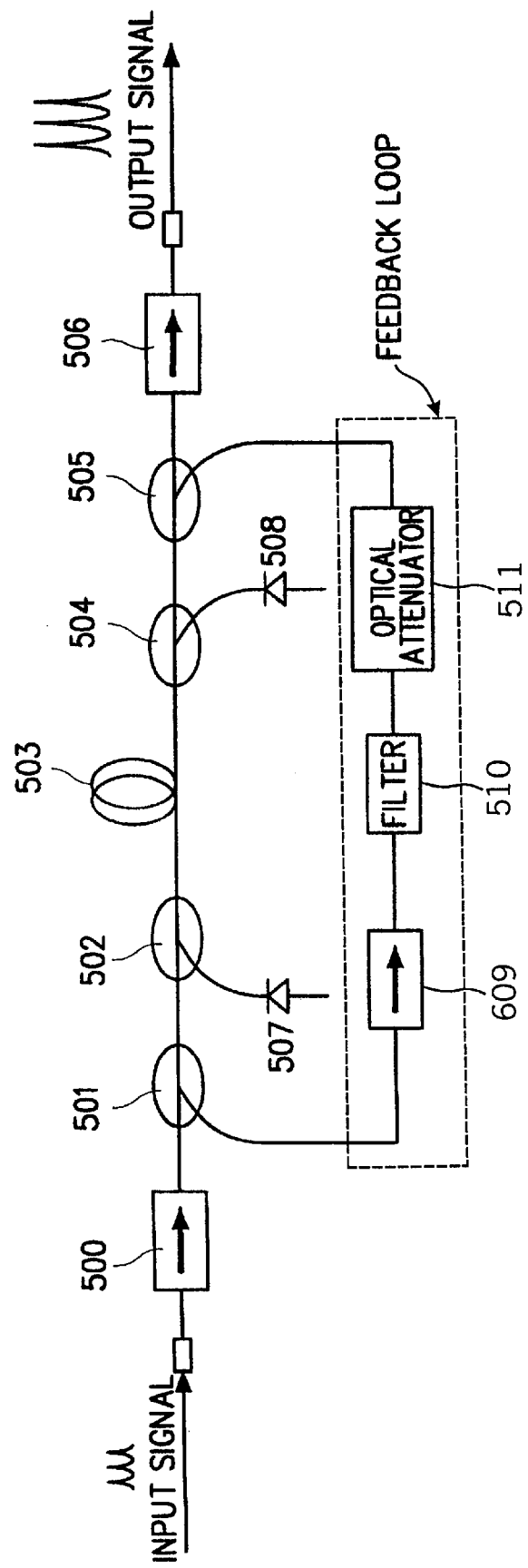
FIG. 6 is a block diagram illustrating the construction of a fiber amplifier using a feedback loop provided with a backward optical isolator according to a fourth embodiment of the present invention.

FIGS. 5 and 6 are block diagrams illustrating the construction of a fiber amplifier using a feedback loop according to a third embodiment and a fourth embodiment of the present invention. As shown in FIGS. 5 and 6, the present invention has the construction which increases the output in the L-band by adding the seed beam to the existing erbium doped fiber amplifier. According to the fiber amplifier according to the present invention, an erbium doped fiber (EDF) 503 is used as the amplification medium, and optical isolators 500 and 506 are inserted on the front and rear of the EDF 503 to intercept the backward lights. Also, third wavelength selective couplers (WSC) 502 and 504 are used for making the respective pumping lights from pump light sources 507 and 508 incident to the EDF 503.

The fiber amplifier according to the present invention employs a feedback loop for using a specified wavelength of the ASE in order to make the seed beam. The feedback loop of the fiber amplifier according to the present invention uses a filter 510 for selecting the specified wavelength, and an optical isolator 509 for preventing the backward propagation of the fed-back seed beam. Also, the feedback loop according to the present invention employs an optical attenuator 511 for adjusting the strength of the input seed beam. At this time, the optical isolator 509 as shown in FIG. 5 is a forward optical isolator the propagation direction of which is the same as that of the signal light, and the optical isolator 609 as shown in FIG. 6 is a backward optical isolator the propagation direction of which is opposite to that of the signal light.

According to the present invention, two fourth wavelength selective couplers (WSC) 501 and 505 are used for making the seed beam incident again to the amplification medium, and the ASE is fed back to the amplification medium using the fourth wavelength selective couplers 501 and 505. The optical attenuator 511 is inserted between the fourth wavelength selective coupler 505 and the filter 510.

The operation of the erbium doped fiber amplifier as constructed above will be explained in detail. The input optical signal inputted through an input terminal is combined with the pumping light, which is generated from the third forward pump light source 507 provided on the front of the EDF 503, by the third wavelength selective coupler 502, and then is incident to the EDF 503. The pumping light generated from the backward pump light source 508 provided on the rear of the EDF 503 is incident to the EDF 503 through the third wavelength selective coupler 504. The incident forward and backward pumping lights excite erbium ions in the EDF 503. The light signal passing through the EDF is amplified by the stimulated emission of the excited erbium ions. The optical isolators 500 and 506 prevent the deterioration of the amplification efficiency of the optical signal by preventing the ASE generated from the EDF 503 from being reflected from optical elements such as a signal input/output connector.

Preferably, in order to heighten the output in the L-band using the fiber amplifier, the length of the amplification medium, i.e., the length of the EDF 503 is sufficiently lengthened. Especially, the length of the EDF 503 used for the L-band EDFA is over 10 times longer than that generally used for the C-band EDFA.

According to the fiber amplifier according to the present invention, the erbium ions in the EDF 503 excited by the pumping lights are spontaneously emitted, and then the ASE lights generate a high-output ASE in the L-band of 1528 nm~1562 nm by the stimulated emission. The high-output ASE generated in the C-band amplifies the signal light in the L-band as it passes through the EDF 503, and the remaining ASE is incident again through the feedback loop to be reused as the seed beam. If the length of the EDF 503 is lengthened, the output of the C-band is reduced, and the output in the L-band is increased. Since the C-band has a wide wavelength, the strength of the total power is big, but the strength of the peak power is small. More erbium ions in the EDF 503, which is the amplification medium, are excited as the peak power for each wavelength, rather than the total power, becomes greater, resulting in that the output in the L-band can be efficiently heightened. Accordingly, if the seed beam in the C-band is used, the wavelength is amplified to heighten the peak power in this wavelength, and thus the L-band can be can be more efficiently amplified. At this time, a specified wavelength can be selected using the filter 510 for filtering the ASE generated from the EDFA to use the specified wavelength as the seed beam.

The filter according to the present invention is fixed to use the wavelength of 1559 nm corresponding to the highest amplification efficiency.

FIG. 7 is a graph illustrating the attenuation degree of signal lights in the feedback loop with respect to three signal lights having different wavelengths from one another, but the same strength, i.e., the gains of the three signal lights according to the strength of the seed beam. Referring to FIG. 7, as a result of test by changing the attenuation degree of the optical attenuator 511 in the feedback loop from 0 dB to 28 dB, it can be recognized that the gain of the fiber amplifier becomes high and even in the optical attenuation range of 4 dB~8 dB.

Since the gain and the gain evenness are changed according to the length of the EDF 503, which is the amplification medium of the fiber amplifier, the strength of the signal light, and the strength of the pumping light, the gain and the gain evenness of the fiber amplifier can be adjusted by changing the attenuation degree of the optical attenuator 511 in the feedback loop.

According to the present invention, for example, the gain and the gain evenness of the signal light were tested for three wavelengths of 1575 nm, 1585 nm, and 1595 nm. In the case of using no seed beam, the gain of the fiber amplifier is lowered to 9.2 dB~16.4 dB, and the gain evenness thereof is 7.2 dB. Meanwhile, as shown in FIG. 7, in the case of using the feedback loop wherein the attenuation degree of the optical attenuator 511 is 4.0 dB, the gain of the fiber amplifier is 26 dB, and the gain evenness thereof is 1.0 dB. According to the present invention, the gain efficiency and the gain evenness of the fiber amplifier can be adjusted by using the feedback loop which can perform the optical attenuation in the range of 0 dB~28 dB as the testing range.

As described above, the present invention provides the advantages that the efficiency of the fiber amplifier is increased by increasing the gain of the fiber amplifier in the L-band using the seed beam, and the manufacturing cost can be reduced by reducing the number of pump laser diodes used for manufacturing the high-output EDFA. Also, according to the present invention, it is not required to use independent seed-beam light sources since the ASE of the EDFA is used. Further, the present invention has the merits that it can improve the gain and gain evenness of the fiber amplifier in the L-band using the seed beam, and can adjust the gain and gain evenness of the fiber amplifier by adjusting the optical attenuator in the feedback loop and changing the strength of the seed beam if the gain and gain evenness of the fiber amplifier is changed according to the length of the EDF which is the amplification medium in the fiber amplifier, strength of the signal light, and strength of the pumping light.

While this invention has been described in connection with what is presently considered to be the most practical and preferred embodiments in that the fiber amplifier can obtain a high output in the L-band by adding a filter, optical isolator, or optical attenuator to the existing fiber amplifier, it is to be understood that other modifications thereof may be made without departing from the scope of the invention. Thus, the invention should not be limited to the disclosed embodiment, but should be defined by the scope of the appended claims and their equivalents.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. A fiber amplifier apparatus, comprising:

an optical fiber amplifying light signals;

a first pump laser diode generating pumping light and being positioned upstream of said fiber;

a second pump laser diode generating pumping light and being positioned downstream of said fiber;

a first plurality of wavelength selective couplers providing the pumping light from said first and second diodes to said fiber;

an output terminal being positioned downstream of said fiber;

an input terminal being positioned upstream of said fiber and output terminal, receiving an input signal light, conveying said input signal light downstream toward said output terminal;

a first plurality of optical isolators including at least a first isolator and a second isolator, said first isolator intercepting upstream propagation of light and being positioned adjacent to and downstream of said input terminal, said second isolator intercepting upstream propagation of light and being positioned adjacent to and upstream of said output terminal;

a feedback loop guiding at least one selected from among a seed beam and an amplified spontaneous emission to be incident to said fiber, thereby producing amplification to L-band optical signals, said feedback loop having a first terminal and a second terminal, said first terminal being positioned upstream of said first pump laser diode and downstream of said first isolator, said second terminal being positioned downstream of said second pump laser diode and upstream of said second isolator;

a second plurality of wavelength selective couplers guiding at least one selected from among the seed beam and the amplified spontaneous emission to be incident to said feedback loop;

a filter being disposed on said feedback loop, filtering specified wavelengths of at least one selected from among the seed beam and the amplified spontaneous emission;

an optical attenuator attenuating a strength of a light signal in said feedback loop, said optical attenuator being positioned in said feedback loop between said filter and said second terminal; and an additional optical isolator being positioned in said feedback loop between said filter and said first terminal, said additional optical isolator intercepting propagation of at least one selected from among the seed beam and the amplified spontaneous emission.

2. The apparatus of claim 1, said first diode generating pumping light propagating downstream toward said fiber.

3. The apparatus of claim 1, said second diode generating pumping light propagating upstream toward said fiber.

4. The apparatus of claim 1, said second plurality of wavelength selective couplers extracting the amplified spontaneous emission when said second plurality of wavelength selective couplers guide the amplified spontaneous emission to be incident to said feedback loop.

5. The apparatus of claim 1, said optical fiber corresponding to a rare earth doped fiber.

6. The apparatus of claim 5, said optical fiber corresponding to an erbium doped fiber.

7. The apparatus of claim 1, said optical fiber corresponding to an erbium doped fiber.

8. The apparatus of claim 1, said fiber amplifier apparatus corresponding to a long-band fiber amplifier apparatus.

9. The apparatus of claim 4, said fiber amplifier apparatus corresponding to a long-band fiber amplifier apparatus.

10. The apparatus of claim 4, said additional optical isolator corresponding to one selected from among a first additional isolator guiding the seed beam to be incident to said fiber in a same direction as said input signal light and a second additional isolator guiding the seed beam to be incident to said fiber in an opposite direction as said input signal light.

11. A fiber amplifier apparatus, comprising:

an optical fiber amplifying light signals;

a first pump laser diode generating pumping light and being positioned upstream of said fiber;

a second pump laser diode generating pumping light and being positioned downstream of said fiber;

a first plurality of wavelength selective couplers providing the pumping light from said first and second diodes to said fiber;

an output terminal being positioned downstream of said fiber;

an input terminal being positioned upstream of said fiber and output terminal, receiving an input signal light, conveying said input signal light downstream toward said output terminal;

a first plurality of optical isolators intercepting propagation of light;

a feedback loop guiding at least one selected from among a seed beam and an amplified spontaneous emission to be incident to said fiber, thereby producing amplification to L-band optical signals, said feedback loop having a first terminal and a second terminal, said first terminal being positioned upstream of said first pump laser diode and downstream of said input terminal, said second terminal being positioned downstream of said second pump laser diode and upstream of said output terminal;

a second plurality of wavelength selective couplers guiding at least one selected from among the seed beam and the amplified spontaneous emission to be incident to said feedback loop;

a filter being positioned in said feedback loop, filtering specified wavelengths of at least one selected from among the seed beam and the amplified spontaneous emission;

an optical attenuator attenuating a strength of at least one selected from among the seed beam and the amplified spontaneous emission, said optical attenuator being positioned in said feedback loop between said filter and said second terminal of said feedback loop; and an additional optical isolator being positioned in said feedback loop between said filter and said first terminal of said feedback loop, said additional optical isolator intercepting propagation of at least one selected from among the seed beam and the amplified spontaneous emission.

12. The apparatus of claim 11, said second plurality of wavelength selective couplers extracting the amplified spontaneous emission when said second plurality of wavelength selective couplers guide the amplified spontaneous emission to be incident to said feedback loop.

13. The apparatus of claim 11, said optical fiber corresponding to a rare earth doped fiber.

14. The apparatus of claim 11, said optical fiber corresponding to an erbium doped fiber.

15. The apparatus of claim 11, said fiber amplifier apparatus corresponding to a long-band fiber amplifier apparatus.

16. The apparatus of claim 15, said additional optical isolator corresponding to one selected from among a first additional isolator guiding the seed beam to be incident to said fiber in a same direction as said input signal light and a second additional isolator guiding the seed beam to be incident to said fiber in an opposite direction as said input signal light.

17. The apparatus of claim 11, said additional optical isolator corresponding to one selected from among a first additional isolator guiding the seed beam to be incident to said fiber in a same direction as said input signal light and a second additional isolator guiding the seed beam to be incident to said fiber in an opposite direction as said input signal light.

18. An apparatus, comprising:
an optical fiber receiving an input signal light from an input terminal and outputting light to an output terminal;
a plurality of pump laser diodes outputting pumping light to be incident to said fiber;
a feedback loop guiding at least one selected from among a seed beam and an amplified spontaneous emission to be incident to said fiber, thereby producing amplification to L-band optical signals, said feedback loop having a first terminal and a second terminal, said first terminal being positioned upstream of said fiber and downstream of said input terminal, said second terminal being positioned downstream of said fiber and upstream of said output terminal;
a plurality of wavelength selective couplers being connected to said feedback loop and guiding at least one selected from among the seed beam and the amplified spontaneous emission to be incident to said feedback loop;
a filter being positioned in said feedback loop, filtering predetermined wavelengths of at least one selected from among the seed beam and the amplified spontaneous emission;

an optical attenuator attenuating a strength of a light signal, said optical attenuator being positioned in said feedback loop between said filter and said second terminal of said feedback loop; and an additional optical isolator being positioned in said feedback loop between said filter and said first terminal of said feedback loop, said additional optical isolator intercepting propagation of light.

19. The apparatus of claim 18, said fiber corresponding to a rare earth doped fiber amplifying the input signal light.

20. The apparatus of claim 19, said plurality of diodes further comprising:
a first diode generating pumping light and being positioned upstream of said fiber; and
a second diode generating pumping light and being positioned downstream of said fiber.

21. The apparatus of claim 20, further comprising:
a first additional wavelength selective coupler providing the pumping light from said first diode to said fiber in a downstream direction; and
a second additional wavelength selective coupler providing the pumping light from said second diode to said fiber in an upstream direction.

22. The apparatus of claim 21, said apparatus corresponding to a long-band fiber amplifier apparatus.

23. The apparatus of claim 21, further comprising:
a first optical isolator being positioned upstream of said first additional wavelength selective coupler, preventing upstream propagation of light; and
a second optical isolator being positioned downstream of said second additional wavelength selective coupler, preventing upstream propagation of light.

24. The apparatus of claim 23, said plurality of wavelength selective couplers extracting the amplified spontaneous emission when said plurality of wavelength selective couplers guide the amplified spontaneous emission to be incident to said feedback loop.

25. The apparatus of claim 24, said additional optical isolator intercepting propagation of at least one selected from among the seed beam and the amplified spontaneous emission.

26. The apparatus of claim 18, said apparatus corresponding to a long-band fiber amplifier apparatus.

27. The apparatus of claim 25, said additional optical isolator corresponding to one selected from among a first additional isolator guiding the seed beam to be incident to said fiber in a same direction as said input signal light and a second additional isolator guiding the seed beam to be incident to said fiber in an opposite direction as said input signal light.

28. The apparatus of claim 25, said additional optical isolator corresponding to one se lectured from among a first additional isolator guiding the amplified spontaneous emission to be incident to said fiber in a same direction as said input signal light and a second additional isolator guiding the amplified spontaneous emission to be incident to said fiber in an opposite direction as said input signal light.

29. The apparatus of claim 28, said fiber corresponding to an erbium doped fiber.

* * * * *